United States Patent

Blumenschein et al.

[11] Patent Number: 5,928,591
[45] Date of Patent: *Jul. 27, 1999

[54] METHOD OF PREPARING A GAS BAG COVER WITH AN EMBLEM

[75] Inventors: Oliver Blumenschein, Schorndorf; Anton Fischer, Heuchlingen; Bernd Nusshör, Spraitbach, all of Germany

[73] Assignee: TRW Occupant Restraint Systems GmbH, Alfdorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/692,871

[22] Filed: Aug. 2, 1996

[30] Foreign Application Priority Data

Aug. 3, 1995 [DE] Germany .............................. 295 12 551

[51] Int. Cl.⁶ .................................................... E04B 41/00
[52] U.S. Cl. .......................... 264/132; 264/129; 264/164; 264/211.12; 264/176.1
[58] Field of Search ................................. 428/195, 411.1, 428/913, 331; 427/286; 264/101, 129, 132, 164, 173.12, 176.1, 211.12, 292, 293, 294, 297.2, 340

[56] References Cited

U.S. PATENT DOCUMENTS

| | | |
|---|---|---|
| 3,663,353 | 5/1972 | Loug et al. . |
| 4,064,302 | 12/1977 | Kozlowski et al. ..................... 428/152 |
| 4,520,064 | 5/1985 | Kanzelberger . |
| 5,085,932 | 2/1992 | Fujita et al. ............................ 428/331 |

FOREIGN PATENT DOCUMENTS

| | | |
|---|---|---|
| 181351 | 5/1989 | Japan . |
| 2115054 | 9/1990 | Japan . |
| 4314648 | 11/1992 | Japan . |

*Primary Examiner*—Merrick Dixon
*Attorney, Agent, or Firm*—Tarolli, Sundheim, Covell Tummino & Szabo

[57] ABSTRACT

The invention relates to a cover for a gas bag of an occupant restraining system in vehicles which is provided with an emblem, obtainable by direct printing of a predetermined surface of the cover made of plastic with one or more printing inks and/or by stamping an embossing foil on the predetermined surface of the cover.

5 Claims, 1 Drawing Sheet

METHOD OF PREPARING A GAS BAG COVER WITH AN EMBLEM

BACKGROUND OF THE INVENTION

1. Field of the Invention

The invention concerns a cover for a gas bag of an occupant restraining system in vehicles, which is provided with the emblem of a vehicle manufacturer.

2. Description of the Prior Art

Covers for the gas bags of an occupant restraining system in vehicles are usually manufactured as plastic parts using the injection moulding process. In order to attach the emblems of vehicle manufacturers to the covers, metal badges are normally used which are secured to the cover plate of such a cover by means of stamped sheet metal lugs or tags and are bent around at the back of the cover plate. Furthermore, badges are known, which can be secured to the cover by way of a screw connection or by riveting. The emblem is usually printed onto a metal foil which is glued to the badge.

These metal emblems are expensive to produce. There is always the constant risk with badges of this kind, that the connection between the metal emblem and the cover or between the metal foil and the badge will break.

SUMMARY OF THE INVENTION

According to the invention therefore, a cover bearing an emblem is provided for a gas bag of an occupant restraining system in vehicles, which is obtainable by directly printing onto a predetermined surface of the cover made of plastic with one or more printing inks and/or embossing an embossing foil onto the predetermined surface of the cover.

According to the invention, the predetermined surface of the cover is preferably printed initially with one or more printing inks. Printing is carried out using the known screen printing process or any other printing process suitable for printing plastics. In the case of a single colour design, the plastic can even be directly pigmented on the predetermined surface. A metallizing embossing foil is then stamped or embossed onto the predetermined surface of the cover, preferably by hot-process embossing (hot-stamping). In particular, metal effect surfaces, contour lines etc., can be produced with the help of hot-process embossing, if these cannot be produced by a printing process.

Prior to printing, the predetermined surface is preferably treated with a primer, in order to guarantee adequate adhesion of the printing inks to the plastic surface of the cover. In particular, it is preferred that the predetermined surface is an integral part of the cover.

According to a further embodiment of the present invention, the predetermined surface of the cover is an emblem carrier formed of a plastic injection moulding, on the rear of which, facing the cover, is at least one attachment element to secure the emblem carrier to the cover. The attachment element is passed, in an advantageous way, through an appropriate opening in the cover and is connected to the latter by a known method, for example, by screw connection. Before the emblem carrier is secured to the cover, its front will be printed directly with one or more printing inks and/or an embossing foil will be stamped on it. The use of the emblem carrier formed from a plastic injection moulding also facilitates direct pigmenting of the plastic and/or subsequent treatment with various printing inks and the subsequent stamping on of metallic effect surfaces or lines. The invention therefore also concerns the emblem carrier described for attaching the emblem to the cover.

The present invention thus provides a one-part emblem attachment. This avoids the risk of parts of the emblem attachment from becoming separated, for example by separation of the connection between a metal badge and the cover plate of the cover or of the metal foil and its support. With the cover according to the invention, any deterioration in the quality of the colour and print beyond the life of the vehicle in the event of an accident, does not result in any risk to the vehicle occupants, because the mass of the ink can be ignored and, when the coven bursts open as a result of the unfolding of the gas bag, this cannot be regarded as a flying component. As a plastic component, the emblem attachment according to the invention, also facilitates manufacture at low prices whilst achieving high precision. Furthermore, the galvanisation of metallic parts previously required, can be dispensed with.

BRIEF DESCRIPTION OF THE DRAWINGS

The invention is explained in greater detail below, with reference to the drawing. In the drawing.

DESCRIPTION OF THE PREFERRED EMBODIMENT

Figure 1:
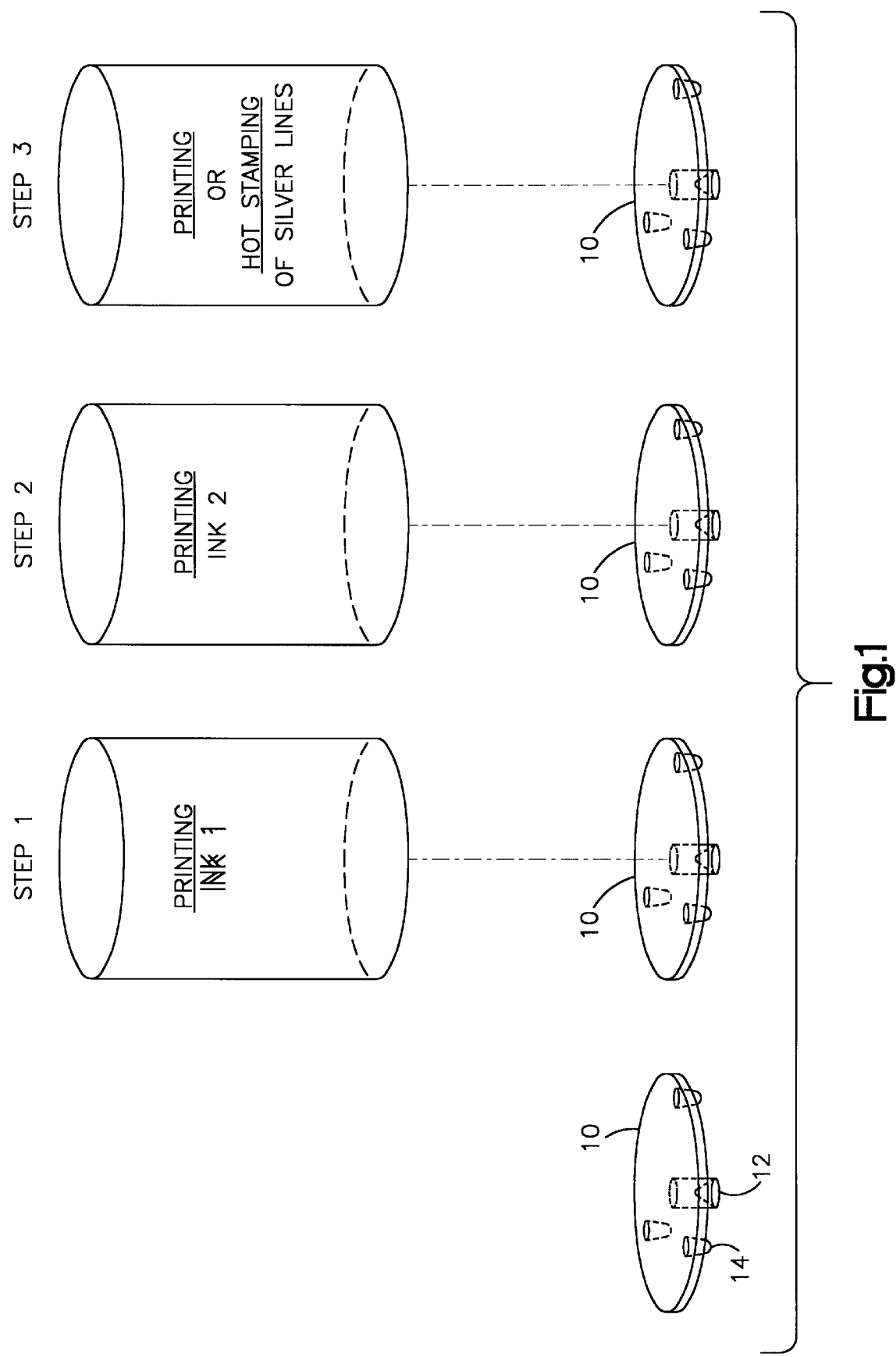
FIG. 1 shows a schematic representation of process steps, according to which one embodiment of the cover according to the invention, can be obtained.

According to FIG. 1, an emblem carrier 10 formed from a plastic injection moulding is initially provided, which has a mounting pin 12 moulded onto the rear, together with several moulded-on pins 14. The front of the emblem carrier 10 shall be preferably pre-treated with a primer. The shape of the emblem carrier is optional and corresponds preferably to the base surface of the vehicle manufacturer's emblem.

During a first step, the ink 1, preferably the ground or primary colour of the manufacturer's emblem, is printed on the primed front face of the emblem carrier 10 in a printing machine. Printing is carried out using known printing processes, for example, by screen printing. In a second step, an ink 2 which is different from ink 1, is printed on and this produces a preset image pattern. This second step is optionally repeated with different printing inks, until the desired emblem is complete.

Silver lines or other metallic effect surfaces and lines may be produced in a third step by stamping a metallizing embossing foil onto the front face of the emblem carrier 10. Step 2 can be dispensed with if the vehicle manufacturer's emblem consists of only one primary colour and one metallic-effect logo.

After the emblem carrier 10 has been provided with the vehicle manufacturer's emblem then, in order to secure the emblem carrier 10 to the cover for the gas bag, the mounting pin 12 is passed through a corresponding opening in the cover or cover plate and is secured to the cover in the conventional way. The pins 14 thus engage in corresponding recesses in the cover and prevent the emblem from slipping.

As a modification of the previously described embodiment, the surface of the cover earmarked for printing cain also be an integral part of the cover or the cover plate of the cover. In this case, a predetermined surface is prepared for subsequent printing during the manufacture of the cover by the plastic injection moulding process or by any other known moulding process. This surface can, for example, he bordered by a stamped line or line that has been raised in relief. After priming the surface, the cover or its cover plate is directly printed in a printing machine in the same way as described above for the emblem carrier 10.

A cover for a gas bag of an occupant restraining system obtained by the last named process offers a higher degree of safety, since no separate parts are used to attach the emblem. At the same time, there are no manufacturing costs for additional, printed metal parts.

What is claimed is:

1. A method for preparing a gas bag cover for a vehicle occupant restraint system, the gas bag cover being provided with an emblem, said method comprising the steps of:

a) forming the gas bag cover from a plastic material by injection molding, the gas bag cover having a plastic outer surface; and b) printing a pattern of one or more printing inks and/or an embossing foil directly onto the plastic outer surface of the gas bag cover to form the emblem.

2. The method of claim 1 further comprising the step of priming the plastic outer surface of the gas bag cover prior to said step (b) of printing a pattern onto the plastic outer surface.

3. The method of claim 1 wherein the plastic outer surface of the gas bag cover forms an integral part of the gas bag cover.

4. A method for preparing a gas bag cover for a vehicle occupant restraint system, the gas bag cover being provided with an emblem, said method comprising the steps of:

a) forming an emblem carrier from a plastic material by injection molding, the emblem carrier having a front face, a rear face opposed to the front face, and at least one attachment pin provided on the rear face;

b) printing a pattern of one or more printing inks and/or an embossed foil on the front face of the emblem carrier to form the emblem; and c) inserting the at least one attachment pin into a corresponding opening in the gas bag cover to secure the emblem carrier to the gas bag cover.

5. The method of claim 4 further comprising the step of priming the front face of the emblem carrier prior to said step (b) of printing a pattern onto the front face of the emblem carrier.

* * * * *